(12) United States Patent
Stolle et al.

(10) Patent No.: US 7,386,389 B2
(45) Date of Patent: Jun. 10, 2008

(54) METHOD AND SYSTEM FOR DETERMINING THE DRIVING SITUATION

(75) Inventors: Uwe Stolle, Unterhaching (DE); Christian Salzmann, Munich (DE)

(73) Assignee: Beyerische Motoren Werke Aktiengesellschaft, Munich (DE)

( * ) Notice: Subject to any disclaimer, the term of this patent is extended or adjusted under 35 U.S.C. 154(b) by 102 days.

(21) Appl. No.: 11/437,807

(22) Filed: May 22, 2006

(65) Prior Publication Data

US 2006/0271269 A1 Nov. 30, 2006

Related U.S. Application Data

(63) Continuation of application No. PCT/EP2004/010704, filed on Sep. 22, 2004.

(30) Foreign Application Priority Data

Nov. 20, 2003 (DE) ............... 103 54 322

(51) Int. Cl.
*G06F 19/00* (2006.01)
*G05B 13/02* (2006.01)

(52) U.S. Cl. ..................... 701/106; 701/115
(58) Field of Classification Search ........ 701/101–106, 701/110, 111, 115; 706/2, 15, 16, 23, 25, 706/41, 44, 45, 48; 700/28–32
See application file for complete search history.

(56) References Cited

U.S. PATENT DOCUMENTS

| 5,410,477 A | 4/1995 | Ishii et al. |
| 5,522,015 A | 5/1996 | Watanabe |
| 5,566,072 A | 10/1996 | Momose et al. |
| 5,751,915 A * | 5/1998 | Werbos ............... 706/2 |
| 5,821,860 A | 10/1998 | Yokoyama et al. |
| 5,924,085 A * | 7/1999 | Werbos ............... 706/2 |

(Continued)

FOREIGN PATENT DOCUMENTS

DE   42 09 150 A1   9/1992

(Continued)

OTHER PUBLICATIONS

L.A. Klein: "Sensor Technologies and Data Requirements for ITS", 2001, Artech House, London, XP002309262.

(Continued)

*Primary Examiner*—Willis R. Wolfe, Jr.
(74) *Attorney, Agent, or Firm*—Crowell & Moring LLP

(57) ABSTRACT

A method and a system for ascertaining the driving situation of a motor vehicle by using data provided in the vehicle indicating the value of at least one state variable of the vehicle are provided. To relieve the burden on the driver a data record providing the history of the at least one state variable is supplied. In a neural network in the motor vehicle is supplied by a suitably programmed computer. The neural network has at least one input layer and one output layer, each of the layers having a plurality of perceptrons. The respective value of the at least one state variable of the respective point in time, preferably a normalized value, is supplied to a perceptron of the neural network. After the neural network has been trained, the current driving situation is output by the perceptrons of the output layer of the neural network.

21 Claims, 1 Drawing Sheet

U.S. PATENT DOCUMENTS

Figures 1, 2:
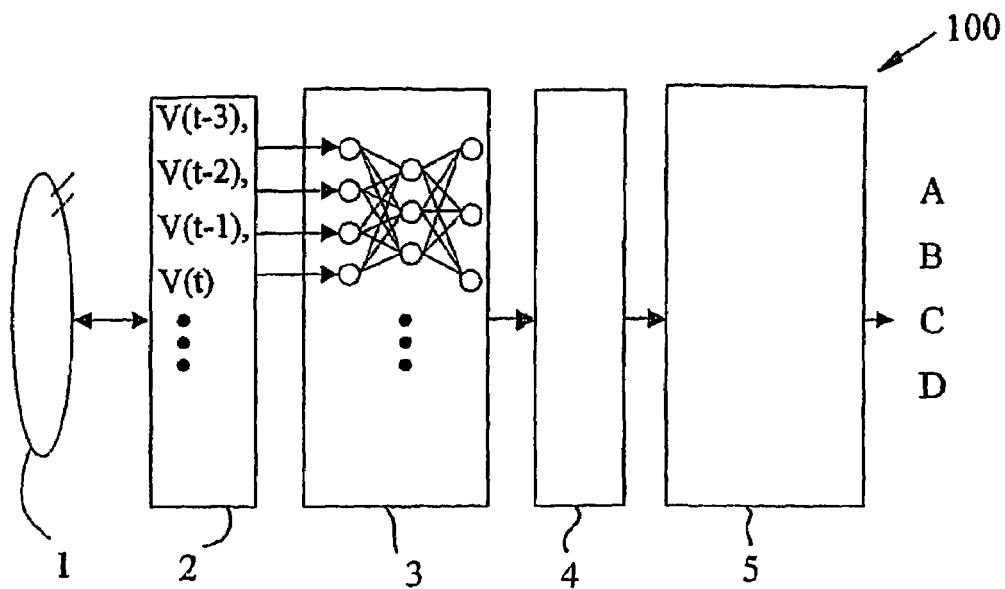

| | | |
|---|---|---|
| 5,991,675 A | 11/1999 | Asanuma |
| 6,208,981 B1 | 3/2001 | Graf et al. |
| 6,424,956 B1 * | 7/2002 | Werbos .................. 706/2 |
| 6,882,992 B1 * | 4/2005 | Werbos .................. 706/48 |
| 7,062,333 B2 * | 6/2006 | Mizutani .................. 700/28 |
| 2002/0128751 A1 | 9/2002 | Engstrom et al. |

FOREIGN PATENT DOCUMENTS

| | | |
|---|---|---|
| DE | 44 19 317 A1 | 12/1994 |
| DE | 44 25 957 C1 | 3/1996 |
| DE | 195 23 111 A1 | 1/1997 |
| DE | 195 27 323 A1 | 1/1997 |
| DE | 197 20 626 A1 | 12/1997 |
| DE | 198 18 239 A1 | 10/1999 |
| DE | 100 10 681 A1 | 9/2001 |
| EP | 0 521 729 A2 | 1/1993 |

OTHER PUBLICATIONS

International Search Report for PCT/EP2004/010704 dated Dec. 21, 2004.

German Search Report for 103 54 322.8 dated Jun. 14, 2004.

* cited by examiner

| To<br>From | Stop & Go | Sporty | City Traffic | Cruising |
|---|---|---|---|---|
| Stop & Go | 0 | 4 (= 8 sec) | 15 (=30 sec.) | 15 (=30 sec.) |
| Sporty | 15 (=30 sec.) | 0 | 15 (=30 sec.) | 15 (=30 sec.) |
| City Traffic | 8 (=16 sec.) | 4 (= 8 sec) | 0 | 8 (=16 sec.) |
| Cruising | 8 (=16 sec.) | 4 (= 8 sec) | 8 (=16 sec.) | 0 |

METHOD AND SYSTEM FOR DETERMINING THE DRIVING SITUATION

CROSS REFERENCE TO RELATED APPLICATIONS

This application claims priority under 35 U.S.C. § 120 to International Patent Application No. PCT/EP2004/010704 filed Sep. 22, 2004, and under 35 U.S.C. § 119 to German Patent Application No. 103 54 322.8 filed Nov. 20, 2003, the entire disclosure of these documents is herein expressly incorporated by reference.

BACKGROUND AND SUMMARY OF THE INVENTION

The present invention relates to a method for determining the driving situation of a motor vehicle and a corresponding system.

Due to the growing volume of information made available in a motor vehicle and the associated demands on the driver, some well-directed relief is required when the burden is high due to the traffic situation. The present invention provides a method and a system for relieving the driver.

One aspect of the inventive method is the use of data provided in the motor vehicle, representing the value of at least one state variable of the vehicle. This data may be made available via the data bus of the vehicle, for example, for implementation of the inventive method. In a first step, a data record providing the history of the at least one state variable is supplied. In a second step, a neural network is made available by a suitably programmed computer in the motor vehicle. The neural network of the inventive method can have at least one input layer and one output layer, each layer having a plurality of perceptrons. In a third step, the respective value of the at least one state variable of the respective point in time, can be standardized to the range of 0 to 1, like all the other values, is sent to one perceptron of the neural network, the current driving situation then being output by the perceptrons of the output layer of the neural network after being trained.

A perceptron is a mathematical function (software function) formed by software, calculating from input values an output value that is relayed to various perceptrons. The input values are weighted and the output value of the perceptron is a mapping function of the weighted input values according to the software function.

Exemplary embodiments of the present invention are explained in greater detail below.

An exemplary neural network is a sigmoid network that can have three layers. Each perceptron in this case is formed by the sigmoid function, which is essentially known. Sigmoid networks are advantageously characterized in that the output value of the perceptron, i.e., the software function is largely linear to the output value, which simplifies further processing.

The prevailing driving state of the vehicle can be ascertained, i.e., determined, from a chronological sequence of driving situations that have been detected. A prevailing driving state is assigned to a chronological sequence of driving situations that have been detected on the basis of at least one assignment specification. Instead of the early driving state, a new driving state can be determined only when the new driving state has already been ascertained, i.e., determined, repeatedly within an interval of time that has elapsed.

A different situation can be assigned to each perceptron of the output layer and/or its output signal. The maximum output signal of all the output signals of the perceptrons of the output layer indicates the current driving situation of the motor vehicle.

The output signal, preferably the signal peak of the first perceptron of the output layer of the neural network can indicate a "stop and go" driving situation. The output signal, such as a signal peak, of the second perceptron of the output layer of the neural network can be defined by the "city traffic" driving situation. The output signal, can be a signal peak of the third perceptron of the output layer of the neural network stands for the "cruising" driving situation. The output signal, can be the signal peak, of the fourth perceptron of the output layer of the neural network stands for the "sporty" driving situation. In summary, the input layer of the neural network, i.e., the corresponding computer program in this embodiment of the present invention, is chronologically supplied with a data record having state variables of the motor vehicle and the driving situation is determined chronologically on the basis of the maximum output signal of all perceptrons of the output layer. It is self-evident that the driving situation thereby determined may also be grouped into a larger or smaller number of classes ("stop and go," etc.).

In an exemplary embodiment of the present invention, the driving situation is considered to be nonspecific when the difference between the value of the maximum output signal of all perceptrons of the output layer and the value of the next smaller output signal of the respective perceptron is less than 20%. The same thing is also true alternatively or additionally in another exemplary embodiment when the value of the greatest output signal of all perceptrons of the output layer is smaller than 10% of its maximum value. For these optional inventive measures it is possible to take into account only driving situations that have been determined with sufficient certainty. This is true in particular of determination of driving state based on the driving situation ascertained.

In another exemplary embodiment of the present invention, the extent of the information to be relayed to the driver of the vehicle is based on the driving state ascertained. With the inventive method and/or system, information with a high deflection such as a telephone call can be withheld from the driver temporarily during a driving state which makes high demands on the driver, e.g., rapid driving on the autobahn, i.e., highway, and/or it is saved for later display, e.g., in a less demanding driving situation.

In an inventive embodiment and/or an inventive man-machine interface, the driver is able to select which information and/or which totality of information in a driving situation of the first class such as "stop and go" is to be displayed and/or output for him in a second class, e.g., "city driving," etc.

Other objects, advantages and novel features of the present invention will become apparent from the following detailed description of the invention when considered in conjunction with the accompanying drawings.

BRIEF DESCRIPTION OF THE DRAWING FIGURES

The present invention is explained in greater detail below with reference to figures, in which FIG. 1 shows a flow chart to illustrate the inventive method for determining the driving situation and the driving state of a motor vehicle; and FIG. 2. shows the state machine from FIG. 1 in detailed form.

DETAILED DESCRIPTION OF THE PREFERRED EMBODIMENTS

For future vehicle generations, it is important for the use of the MMI systems (MMI=man-machine interface) and the vehicle electronics to be adjusted adaptively to the needs of the driver. This may mean, for example, that the quantity of information supplied is reduced in the MMI of the vehicle in dynamic driving situations (e.g., sporty driving or autobahn driving), and more information may be made available to the driver in relaxed or even stationary driving situations (e.g., stop and go).

An important factor here is the driving situation such as fast, concentrated driving on a high-speed road or autobahn, searching driving in an inner city area or relaxed "cruising" on a rural road. This driving situation is to be recognized by a software method—preferably on the basis of data already available in the vehicle. Ideally it should be possible to ascertain the driving situation with data available in the vehicle anyway, e.g., data, messages and/or telegrams on the CAN bus of the vehicle. One problem here is that the driving situation may be perceived very subjectively. Furthermore, the driving situation cannot be determined as a point on the basis of a single point in time, but instead a period of time of a certain length in the past must be taken into account. One prerequisite for this is autonomous detection of the driving situation by the vehicle itself.

The inventive method is executed on an inventive software system which recognizes the prevailing driving situation on the basis of data made available anyway via the electronic vehicle bus system (e.g., CAN bus). The optional exclusive use of data available anyway has the advantage that no additional sensors or control units are required—even a GPS system is not absolutely necessary.

- the "stop and go" driving situation is characterized by stagnation, i.e., a slow flow in traffic at low speeds with frequent standstills;
- the "city traffic" driving situation is characterized by fluid traffic at speeds of approximately 15 km/h up to approximately 70 km/h, frequent steering maneuvers and occasional stopping;
- the "cruising" driving situation is characterized by relaxed driving at speeds above 70 km/h, few steering maneuvers and fluid driving and
- the "sporty" driving situation is characterized by sporty driving, higher longitudinal and transverse accelerations and frequent steering maneuvers.

One aspect of the present invention lies in the "estimate" of the similarity of the real driving situation to the driving situations defined above because there is virtually never an exact correspondence. Another aspect is that the driving situations are situational models which should be evaluated over a certain period of time to allow reliable detection. If only the current data, in particular the CAN data, at the particular point in time were to be used (e.g., every 500 ms), the driving situation might change very 500 ms, which is not desirable. For example, stopping at a stop light or briefly stopping would already be classified and "stop and go," despite the fact that it is perhaps only a short interruption in the "cruising" driving situation. The inventive method and/or system are therefore provided with a certain "inertia."

The inventive method and/or system is/are preferably implemented by a software solution and/or a programmed sequence control forming a neural sigmoid network (e.g., a processor executing machine-readable code). After a continuous supply of values describing the state variable of the vehicle, the sigmoid network outputs a classification of the driving situation determined on the basis of the values. In other words, the neural network, i.e., the sigmoid network supplies a "similarity value," which indicates the similarity of the supplied data, i.e., values to stored data, i.e., values responding to the aforementioned driving situations and determined as part of training of the sigmoid network in the aforementioned driving situations. With a high similarity, the driving situation assigned to the corresponding stored values is assumed to be currently accurate. In this exemplary embodiment, CAN messages that conform to a standard from the standardized CAN bus inside the vehicle are used as the input variables into the sigmoid network. These CAN messages are preferably chronologically discretized and normalized. Additionally or alternatively, data of another data bus provided in the vehicle may of course also be used to determine the driving situation and/or the driving state, if necessary.

At regular intervals, e.g., intervals of approximately 500 ms to approximately 2000 ms, a software component picks up defined types of messages from the CAN bus and processes them accordingly. In doing so, the following known data telegrams of the CAN bus are analyzed:

- CcarSpeed (speed and longitudinal and transverse acceleration of the vehicle; CAN identifier: 416 speed)
- CgearBox (gear engaged and/or gear lever setting; CAN identifier: 772 status gear)
- CsteeringWheelAngle (contains position information on the steering wheel).

It is self-evident that more or fewer data telegrams, i.e., data may be used for calculation of the driving situation and the driving state if expedient or necessary.

To permit an easier understanding of the present invention, first the principles of the inventive method and a brief outline of a neural network of the present invention will be given, followed by detailed explanation of the inventive method and/or system.

The inventive method is roughly divided into two parts.

In the first step the inventive neural network, in particular a sigmoid network, is parametrized. In parameterization, the neural network is trained and the transitions and parameters of the "inertia" of the system are adjusted.

In a second step, the instantaneous driving situation and the current driving situation in the vehicle are calculated. The second step is divided as follows:

- pick up of relevant vehicle data from the CAN bus at appropriate intervals,
- processing of the data for optimum analysis,
- calculation of the current driving situation at the instantaneous point in time on the basis of current and past CAN data, and
- calculation of the prevailing driving state.

Neural networks are known methods and/or systems from informatics which are used, e.g., in image recognition or voice recognition. A neural network consists of a quantity of so-called perceptrons. A perceptron is a software function having a quantity of input values and calculating an output value from them, said output value being relayed as input to various perceptrons. The output value of a perceptron is the result of an imaging function of the weighted input values (inputs) according to the following function, preferably the sigmoid function:

$$F(\text{inputs}) = \frac{1}{1 + e^{\sum_{i \in \text{Inputs}} i}}$$

where "inputs" refers to the quantity of weighted input edges.

A neural network consists of n layers, which in turn already consist of perceptrons, a perceptron of the n-th layer has all the perceptron outputs of the (n−1)-th layer as input values. A three-layer sigmoid network is preferably used with the inventive method and/or system.

An important aspect of neural networks is that they are "trainable" and can thus be adapted to the concrete object. In "training," the network is adjusted through examples by the known so-called "backpropagation" method so that it classifies the new input values like "training values."

In training by the "backpropagation" method, a signal pattern to be recognized is applied to the input layer of the sigmoid network. The perceptrons, i.e., the corresponding software components, perform a calculation according to the sigmoid function. The result of the calculation is output in the form of a signal pattern by the output layer of the sigmoid network. Parameterization of the weights of the individual perceptrons is performed by using known learning methods (algorithms) in which examples of input patterns are created and corresponding output patterns are preselected. The algorithm then adjusts the weights so that the preselected output patterns are calculated, i.e., formed for the preselected input patterns.

Example according to the present invention: the input pattern is a set of CAN messages corresponding to the "city traffic" driving situation. The weights are adjusted so that the output pattern of all the perceptrons of the output layer yields signal level 0, only perceptron number 2 yields signal level 1. Signal level 1 on perceptron 2 is assumed to be representative for the "city traffic" driving situation. After conclusion of training, the sigmoid network according to the present invention classifies real driving situations in a manner similar to that used in the examples of training. It is sufficient here if the real driving situations and/or the data patterns are similar to the trained driving situations and/or their data patterns. A complete correspondence is advantageously not necessary for mostly reliable and correct classification.

The inventive method and/or system provided in a vehicle is/are described in greater detail below.

In a first step, the driving situation is determined at regular intervals on the basis of the instantaneous relevant CAN data and a certain data history of this data by the three-layered neural network, preferably a gradient network or a sigmoid network. For example, the current driving situation may be determined every 0.5 second using the speed and acceleration data at the current point in time t and the data at points in time t−2 seconds and t−4 seconds.

Then in a second step, the driving state is determined on the basis of the current driving situation and the past driving situation as detected. The present recognized driving situation, the past recognized driving situations and the instantaneous driving situation all play a role in determining the driving state.

This will now be illustrated on the basis of an example. If the current driving state is "city traffic" and "stop and go" is recognized repeatedly as the driving situation, then the driving situation is set at "stop and go," i.e., this is regarded as a given, only after the "stop and go" driving situation has been recognized, for example, eight times in a row. Otherwise, in city traffic, a single traffic stop light would result in the driving state being set at "stop and go." However, if the vehicle is in the "cruising" driving state, then it is preferable here to set "stop and go" as the driving state after recognizing the "stop and go" driving state, for example, three times in a row.

As shown in the flow chart 100 in FIG. 1, a software component 2 picks up the data required for ascertaining the driving situation at suitable intervals, preferably 0.5 to 2 seconds, from the CAN bus 1 and forms a history v(t), v(t−1), v(t−2), etc. of data thus picked up. The data of the data history is supplied to the perceptrons of the input layer of the three-layer sigmoid network 3 which outputs the calculated instantaneous driving situation 4 after parametrization and training of the system. The driving situations thereby determined are sent to a so-called state machine 5 which calculates the current driving state from the driving situation's output and outputs it on the basis of the following procedures. The different driving states are labeled as A, B, C, and D, for example, in FIG. 1. This is done continuously using the progressive data history.

The sigmoid network is trained to the driving situations considered expedient by the backpropagation and/or gradient descent method. In other words, a certain driving situation is assigned to certain (typical) input data into the sigmoid network and the weighting in the sigmoid network is adjusted so that the output perceptron that stands for a certain driving situation corresponding to the respective driving situation is assigned a maximum value.

A driving state is assigned to a history of driving situations by the state machine 5 according to the table in FIG. 2. This assignment, i.e., table is based on empirical values.

The steps in the computation method for ascertaining the driving situation and the driving state are explained in greater detail below on the basis of exemplary data:

1. Picking up the relative telegrams on the CAN bus in a certain interval—e.g., every 0.5 to 2 seconds.
2. Processing the CAN data to yield a result vector having the parameters:
   a. Speed
   b. Steering angle is measured continuously and averaged over the time frame of the window (t−1, t)
   c. Transverse acceleration is measured continuously and averaged over the time frame of the window (t−1, t)
   d. Longitudinal acceleration is measured continuously and averaged over the time frame of the window (t−1, t)
   e. Gear status
   Then all data is normalized to have a value between 0 and 1.
3. Input of the vectors into the sigmoid network. Calculation of the current driving situation on the basis of the current and last two data records—i.e., an evaluation based on speed, steering performance and shifting in the last 6 seconds. The following outputs of the output layer of the sigmoid network are processed:
   a. Perceptron 0 is at maximum: driving situation=stop and go
   b. Perceptron 1 is at maximum: driving situation=city traffic
   c. Perceptron 2 is at maximum: driving situation=cruising
   d. Perceptron 3 is at maximum: driving situation=sporty
   e. If the difference between the first maximum and the second maximum is <0.2 or the maximum is <0.1, the driving situation is considered as being undefined.

4. The current driving situation which is calculated every two seconds determines the driving state as follows:
   f. If the system is in driving state A at the point in time t, then driving situation B is recognized and driving situation C is recognized at point in time t−1, then the following holds:
      i. C=undefined, i.e., the current driving state is retained
      ii. The value assigned to driving situation B is greater than or equal to the value assigned to driving situation C: a counter reading Z is incremented by one. The value of the respective driving situation is defined as "stop and go"=0, "city traffic"=1, "cruising"=2, "sporty"=3.
   g. If there is a change in driving state, the counter reading Z is set at 0. If the same driving situation is recognized repeatedly, the driving state determined changes. This accomplished by a state machine taking into account the counter reading in the way indicated in the table in FIG. 2. In other words, for example:
   if the "sporty" driving state is recognized four times in a row in succession and/or continuously for 8 seconds and if the current driving state is still the "stop and go" driving state, then the "sporty" driving state is considered as being the currently prevailing state
   if the "cruising" driving state is recognized eight times in a row in succession and/or continuously for 18 seconds and if the current driving state is still the "city traffic" driving state, then the "cruising" driving state is considered as being the currently prevailing state.

This method may be employed with various parameters (history, CAN data, etc.). Therefore, a general description of the method will be presented here again.

This method depends on the amount of n input parameters, the width of the time window $\delta$ and the length of the history included, $k \cdot \delta$. This method is thus roughly divided into the following steps:

1. Picking up, discretizing and processing the s input parameters:
   a. Picking up the input parameters at point in time t
   b. Picking up the input parameters at point in time $t+1=t+\delta$
   c. For many types of signals that fluctuate between time cycles t and t+1, it is beneficial to average the values. If the signal p in the time window (t, t+1) is output on the bus n times, then the calculation is performed as follows
   d. Repeating step 2 k times, yielding an input vector of the following form at time t0
   e. Normalizing the input parameters so that all values are between 0 and 1
   f. Any numerical differentiation according to t selected signals increases the recognition output.
2. Calculating the input vector with the help of the three-layer sigmoid network:
   An input signal vector of the defined form from 1.d is fed in discrete intervals $\delta$ into the sigmoid network. The data is shifted here through the input vector ("sliding window").
   a. A three-layer sigmoid network is used for the calculation, having an input perceptron for each input time value, i.e., $k \cdot n$ input perceptrons).
   b. Instead of the numerical differentiation from point 1.d, a second hidden layer may also be used in the network.
   c. The number of output perceptrons is equal to the number of driving situations to be recognized.
3. Calculation of the driving situation:
   a. Perceptron k is at maximum: driving situation k is considered as given.
   b. If the difference between the first maximum and the second maximum is <0.2 or the maximum is <0.1, then "undefined" is output as the driving situation recognized.
4. Analysis and time delay due to state machine:
   The current driving situation, which is calculated periodically with regard to $\delta$, now has the following influence on the driving state ascertained.
   a. If the system at point in time t is in driving state A, driving situation B is recognized and driving situation C was recognized at point in time t−1, then the following holds:
      i. C=undefined; the current driving state is continued
      ii. The value of driving situation B is greater than or equal to the value of driving situation C: the counter reading Z is incremented by one. An order of driving situations to be defined is applicable here, i.e., values such as 0, 1, 2, 3, and 4 are assigned to the driving situations.
   b. If the same driving situation has been recognized repeatedly, the driving state changes. This is accomplished by the state machine by taking counter reading Z into account accordingly (see above).
   c. If Z reaches the defined value, the driving state changes and Z is set at zero.
5. The method begins again at step 1.

It is clear from the preceding discussion that the inventive method and/or system permit(s) a reliable determination of the driving situation and the driving state. In other words, the actual driving mode is used as input, not the trip environment (e.g., "highway") and the driving mode presumed to be associated with it. Systems based on position determination (when "on the highway" is determined (via GPS), then the driving situation is considered as being "driving fast") are less accurate because the actual driving mode may be quite different. With the method and system described here, it is possible to determine the driving situation regardless of the driving environment. For example, if the driver exhibits a driving performance on a country road like that on the highway, the "highway" driving situation will be recognized regardless of the actual conditions.

The inventive method and/or system may be advantageously—but need not be—implemented on the basis of the standard CAN data present in the vehicle anyway or other data that is inexpensively available in any vehicle without requiring special equipment such as a navigation system with GPS.

The inventive method and/or system is easily parametrizable and can thus be adapted flexibly to altered boundary conditions (e.g., new type of vehicle). Furthermore, the hardware requirements are very low (CPU, memory use) and no additional sensors are required. Therefore, it can be made available to drivers at a low cost from this standpoint as well.

The inventive method and/or system for recognition of the driving situation and/or driving state may be used for adaptation of any suitably adaptable vehicle functions and/or vehicle systems depending on the driving situation and/or driving state. Examples include:
  adaptive mission control
  adaptive running gear
  adaptive cruise control
  adjustment of the scale of the navigation map on the display of an electronic navigation system, depending on the driving situation detected
  adaptive steering translation in active front steering
  adaptive light width regulation and/or adaptive light cone adjustment.

Another possible application is operation of man-machine interfaces as a function of driving situation and/or driving state to relieve the burden on the driver; for example, the quantity of information forwarded to the driver may be based on the current driving state. Of course there are many other applications that take into account the current driving state.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A processor programmed to execute machine-readable code to perform the acts of:
   receiving a data record of a history of the at least one state variable;
   generating, by a programmed computer, a neural network in the motor vehicle, the neural network having at least one input layer and one output layer, each of the layers having a plurality of perceptrons;
   supplying, to a perceptron of the neural network, a respective value of the at least one state variable of a respective point in time; and
   outputting the current driving situation by the perceptrons of the output layer of the neural network after it has been trained, wherein a current driving state of the vehicle is set and/or defined from a chronological sequence of driving situations ascertained.

2. A method for ascertaining a driving situation of a motor vehicle by using data provided in the vehicle indicating the value of at least one state variable of the vehicle, the method comprising the acts of:
   receiving a data record of a history of the at least one state variable;
   generating, by a programmed computer, a neural network in the motor vehicle, the neural network having at least one input layer and one output layer, each of the layers having a plurality of perceptrons;
   supplying, to a perceptron of the neural network, a respective value of the at least one state variable of a respective point in time; and
   outputting the current driving situation by the perceptrons of the output layer of the neural network after it has been trained, wherein a current driving state of the vehicle is set and/or defined from a chronological sequence of driving situations ascertained.

3. The method of claim 2, wherein instead of an earlier driving state, a new driving state is ascertained only when the new driving state has been set and/or determined repeatedly within an interval of time that has elapsed.

4. The method of claim 2, wherein at least one device of the vehicle is adapted to the driving situation ascertained, the driving state ascertained, or the extent of the information forwarded to the driver of the motor vehicle is based on the driving state ascertained.

5. The method of claim 2, wherein the respective value of the at least one state variable of the respective point in time is a normalized value.

6. The method of claim 2, wherein the neural network is a sigmoid network.

7. The method of claim 6, wherein the neural network has three layers.

8. A method for ascertaining a driving situation of a motor vehicle by using data provided in the vehicle indicating the value of at least one state variable of the vehicle, the method comprising the acts of:
   receiving a data record of a history of the at least one state variable;
   generating, by a programmed computer, a neural network in the motor vehicle, the neural network having at least one input layer and one output layer, each of the layers having a plurality of perceptrons;
   supplying, to a perceptron of the neural network, a respective value of the at least one state variable of a respective point in time; and
   outputting the current driving situation by the perceptrons of the output layer of the neural network after it has been trained, wherein a current driving state is assigned to a chronological sequence of driving situations ascertained, this assignment being made on the basis of at least one allocation procedure.

9. The method of claim 8, wherein at least one device of the vehicle is adapted to the driving situation ascertained, the driving state ascertained, or the extent of the information forwarded to the driver of the motor vehicle is based on the driving state ascertained.

10. The method of claim 8, wherein the respective value of the at least one state variable of the respective point in time is a normalized value.

11. The method of claim 8, wherein the neural network is a sigmoid network.

12. The method of claim 11, wherein the neural network has three layers.

13. A method for ascertaining a driving situation of a motor vehicle by using data provided in the vehicle indicating the value of at least one state variable of the vehicle, the method comprising the acts of:
   receiving a data record of a history of the at least one state variable;
   generating, by a programmed computer, a neural network in the motor vehicle, the neural network having at least one input layer and one output layer, each of the layers having a plurality of perceptrons;
   supplying, to a perceptron of the neural network, a respective value of the at least one state variable of a respective point in time; and
   outputting the current driving situation by the perceptrons of the output layer of the neural network after it has been trained, wherein a different driving situation is assigned to each perceptron of the output layer or its output signal and the maximum output signal of all output signals of the perceptrons of the output layer indicates the current situation of the motor vehicle.

14. The method of claim 13, wherein the driving situation is considered indefinite if the difference between the value of the maximum output signal of all perceptrons of the output layer and the value of a next smaller output signal of the respective perceptron is less than 20% or the value of the greatest output signal of all perceptrons of the output layer is less than 10% of its maximum value.

15. The method of claim 13, wherein the output signals of the perceptrons are standardized.

16. The method of claim 13, wherein at least one device of the vehicle is adapted to the driving situation ascertained, the driving state ascertained, or the extent of the information forwarded to the driver of the motor vehicle is based on the driving state ascertained.

17. The method of claim 13, wherein the respective value of the at least one state variable of the respective point in time is a normalized value.

18. The method of claim 13, wherein the output signal of the first perceptron of the output layer of the neural network indicates a "stop and go", of the second perceptron of the output layer of the neural network indicates a "city driving" driving situation, of the third perceptron of the output layer of the neural network indicates a "cruising" driving situation, or of the fourth perceptron of the output layer of the neural network indicates a "sporty" driving situation.

19. The method of claim 18, wherein the output signal is a signal maximum.

20. The method of claim 13, wherein the neural network is a sigmoid network.

21. The method of claim 20, wherein the neural network has three layers.

* * * * *